United States Patent [19]
Phillips et al.

[11] Patent Number: 5,510,842
[45] Date of Patent: Apr. 23, 1996

[54] PARALLEL ARCHITECTURE FOR A HIGH DEFINITION TELEVISION VIDEO DECODER HAVING MULTIPLE INDEPENDENT FRAME MEMORIES

[75] Inventors: Larry Phillips, Collingswood, N.J.; Saiprasad V. Naimpally, Langhorne; Robert Meyer, Bensalem, both of Pa.; Shuji Inoue, Mount Holly, N.J.

[73] Assignee: Matsushita Electric Corporation of America, Secaucus, N.J.

[21] Appl. No.: 238,269

[22] Filed: May 4, 1994

[51] Int. Cl.$^6$ .................................................. H04N 7/12
[52] U.S. Cl. ........................................ 348/426; 348/416
[58] Field of Search ................................ 348/412, 413, 348/415, 416, 420, 426; H04N 7/12

[56] References Cited

U.S. PATENT DOCUMENTS

| | | | |
|---|---|---|---|
| 4,218,704 | 8/1980 | Netravali et al. | 348/416 |
| 4,694,328 | 9/1987 | LoCicero et al. | 348/426 |
| 5,130,797 | 7/1992 | Murakami et al. | 348/416 |
| 5,159,452 | 10/1992 | Kinoshita et al. | 348/466 |
| 5,249,047 | 9/1993 | Aoki et al. | 358/135 |
| 5,278,646 | 1/1994 | Civanlar et al. | 348/415 |

FOREIGN PATENT DOCUMENTS

| | | | |
|---|---|---|---|
| 9111074 | 7/1991 | WIPO | H04N 7/00 |

OTHER PUBLICATIONS

H. Sun, "Hierarchical Decoder for MPEG Compressed Video Data", *IEEE Transactions on Consumer Electronics*, vol. 39, No. 3, pp. 559–564 (Aug. 1993).

A. Mayer, "The Architecture of a Processor Array for Video Decompression", *IEEE Transactions on Consumer Electronics*, vol. 39, No. 3, pp. 565–569 (Aug. 1993).

A. Netravali et al., "A High Quality Digital HDTV CODEC", IEEE Transactions on Consumer Electronics, vol. 37, No. 3, pp. 320–330 (Aug. 1991).

T. Liu et al., "Hardware Implementation and Cost of Decoders for Digital HDTV", IEEE Transactions on Consumer Electronics, vol. 37, No. 3, pp. 331–336 (Aug. 1991).

*Primary Examiner*—James J. Groody
*Assistant Examiner*—Jeffrey S. Murrell
*Attorney, Agent, or Firm*—Ratner & Prestia

[57] ABSTRACT

A parallel decoder for an MPEG-2 encoded video signal includes a deformatter which separates the input bit stream into multiple portions, each representing a respectively different section of the HDTV image. The separate portions are processed in parallel by respective decoders. In order to perform motion compensated processing, each of the four decoders includes a memory that holds data representing the entire image. Each decoder provides its decoded output data to all of the decoders to maintain the data in the respective memories.

9 Claims, 5 Drawing Sheets

| | T0 | T1 | T2 | T3 | T4 | T5 | T6 | T7 | T8 | T9 | T10 | T11 | T12 | T13 | T14 | T15 |
|---|---|---|---|---|---|---|---|---|---|---|---|---|---|---|---|---|
| INPUT | $P_{-3}$ | $B_{-5}$ | $B_{-4}$ | $I_0$ | $B_{-2}$ | $B_{-1}$ | $P_3$ | $B_1$ | $B_2$ | $P_6$ | $B_4$ | $B_5$ | $P_9$ | $B_7$ | $B_8$ | $P_{12}$ |
| MCM 618a IN | $P_{-3}$ | | | | | | | | | $P_6$ | | | | | | $P_{12}$ |
| MCM 618a OUT | | $P_{-6}$ | $P_{-6}$ | $I_0$ | $I_0$ | $I_0$ | $I_0$ | $I_0$ | $I_0$ | | $P_6$ | $P_6$ | $P_6$ | $P_6$ | $P_6$ | |
| MCM 618b IN | $P_{-3}$ | | | | $P_{-3}$ | $P_{-3}$ | | | | | $P_3$ | | | | $P_9$ | $P_9$ |
| MCM 618b OUT | | $P_{-3}$ | $P_{-3}$ | | | | $P_3$ | $P_3$ | $P_3$ | $P_3$ | $P_3$ | | $P_9$ | $P_9$ | | |
| RM 630a IN | | | $I_0$ | | | | | | $P_6$ | | | $P_9$ | | | | $P_{12}$ |
| RM 630a OUT | $P_{-6}$ | | | | | $P_{-3}$ | | | | | | | $P_6$ | | | |
| RM 630b IN | | | | | $P_{-3}$ | | $P_3$ | | | | | $P_9$ | | | | |
| RM 630b OUT | | | | | | | | | | $P_3$ | | | | $P_6$ | | |
| RM 630c IN | | $B_{-5}$ | | $B_{-2}$ | | $B_{-1}$ | | $B_1$ | $B_1$ | | $B_4$ | | | $B_7$ | | |
| RM 630c OUT | | | $B_{-4}$ | | | | $B_{-1}$ | | | $B_2$ | | $B_5$ | | | $B_8$ | |
| RM 630d IN | | | $B_{-4}$ | | $B_{-2}$ | | | $B_1$ | $B_2$ | | | $B_5$ | | | $B_8$ | |
| RM 630d OUT | $B_{-5}$ | $B_{-4}$ | | | | $B_{-1}$ | | | $B_2$ | | $B_4$ | | $B_7$ | | $B_8$ | |
| OUTPUT | $P_{-6}$ | $B_{-5}$ | $B_{-4}$ | $P_{-3}$ | $B_{-2}$ | $B_{-1}$ | $I_0$ | $B_1$ | $B_2$ | $P_3$ | $B_4$ | $B_5$ | $P_6$ | $B_7$ | $B_8$ | |

FIG. 7

PARALLEL ARCHITECTURE FOR A HIGH DEFINITION TELEVISION VIDEO DECODER HAVING MULTIPLE INDEPENDENT FRAME MEMORIES

BACKGROUND OF THE INVENTION

The present invention relates to decoding of digitally encoded video signals and in particular to a decoder which decodes video signals that have been length encoded according to the MPEG-2 standard.

In the United States a standard has been proposed for digitally encoded high definition television signals. This standard is essentially the same as the MPEG-2 standard, proposed by the Moving Picture Experts Group (MPEG) of the International Standards Organization (ISO). This standard is described in a draft internal standard (DIS) publication entitled "Information Technology—Generic Coding of Moving Pictures and Associated Audio, Recommendation H.626" ISO/IEC 13818-2 DIS, 3/94 which is available from the ISO and which is hereby incorporated by reference for its teaching on the MPEG-2 digital video encoding standard.

The MPEG-2 standard is actually several different standards. In MPEG-2 several different profiles are defined, each corresponding to a different level of complexity of the encoded image. For each profile, different levels are defined, each level corresponding to a different image resolution. One of the MPEG-2 "standards" known as Main Profile, Main Level is intended for encoding video signals conforming to existing television standards (i.e., NTSC and PAL). Another "standard", known as Main Profile, High Level is intended for encoding high-definition television images. Images encoded according to the Main Profile, High Level standard may have as many as 1,152 active lines per image frame and 1,920 pixels per line.

The Main Profile, Main Level standard, on the other hand, defines a maximum picture size of 768 pixels per line and 567 lines per frame. At a frame rate of 30 frames per second, signals encoded according to this standard have a data rate of 13,063,680 pixels per second. By contrast, images encoded according to the Main Profile, High Level standard have a maximum data rate of 1,152*1,920*30 or 66,355,200 pixels per second. This data rate is more than five times the data rate of image data encoded according to the Main Profile Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

Because of this difference in data rates, it is unlikely that the equipment used to decode Main Profile Main Level encoded data will be sufficient to decode high-definition television signals that have been encoded according to the Main Profile, High Level standard.

To be optimally effective, the coding systems should be relatively inexpensive and yet have sufficient power to decode these digital signals in real time.

The MPEG-2 standard defines a complex syntax which contains a mixture of data and control information. Some of this control information is used to enable the signals having several different formats to be covered by the standard. These formats define images, having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in six layers, the sequence layer, the group of pictures layer, the picture layer, the slice layer, the macro block layer, and the block layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

To effectively receive the digital images, a decoder must recognize and extract the control portions and the side information, and then use the extracted information to process the video signal information.

Using existing techniques, a decoder may be implemented using a single processor having a complex design and operating at a high data rate to perform this function. This high data rate, however, would require very expensive circuitry, which would be contrary to the implementation of a decoder in Consumer television receiver in which cost is a major factor.

SUMMARY OF THE INVENTION

The present invention is embodied in a decoder which is suitable for decoding high definition television images that have been encoded according to the MPEG-2 Main Profile, High Level standard. The exemplary decoder has a parallel processing architecture. This decoder includes a deformatter which separates the input bit stream into multiple portions, each representing a respectively different section of the HDTV image. The separate portions are processed in parallel by respective decoders. In order to perform motion compensated processing, each of the four decoders includes a memory that holds data representing the entire image.

According to one aspect of the invention, each decoder provides its output signal to all of the decoders to maintain the data in the respective memories.

DETAILED DESCRIPTION

The exemplary embodiment of the invention decodes HDTV signals which have been encoded according to the MPEG-2 standard and in particular, the Main Profile, High Level MPEG-2 standard. The invention described herein, however, is not limited to decoding this type of information.

It may also be used to decode other types of variable-length encoded video data, where the encoded data corresponds to distinct areas of the original image.

The MPEG-2 Main Profile standard defines a sequence of images in six levels: the sequence level, the group of pictures level, the picture level, the slice level, the macroblock level and the block level. Each of these levels may be considered to be a record in a data stream, with the later-listed levels occurring as nested sub-levels in the earlier listed levels. The records for each level, except the block level, include a header section which contains data that is used in decoding its sub-records. The actual image pixel data is contained in the block records.

Each block of the encoded HDTV signal contains data representing 64 respective coefficient values of a discrete cosine transform (DCT) representation of 64 picture elements (pixels) in the HDTV image.

In the encoding process, the pixel data is subject to motion compensated differential coding prior to the discrete cosine transformation and the blocks of transformed coefficients are further encoded by applying run-length and variable length encoding techniques. A decoder which recovers the image sequence from the data stream reverses the encoding process. This decoder employs a variable length decoder, an inverse discrete cosine transform processor and a motion compensation processor.

Figure 1:
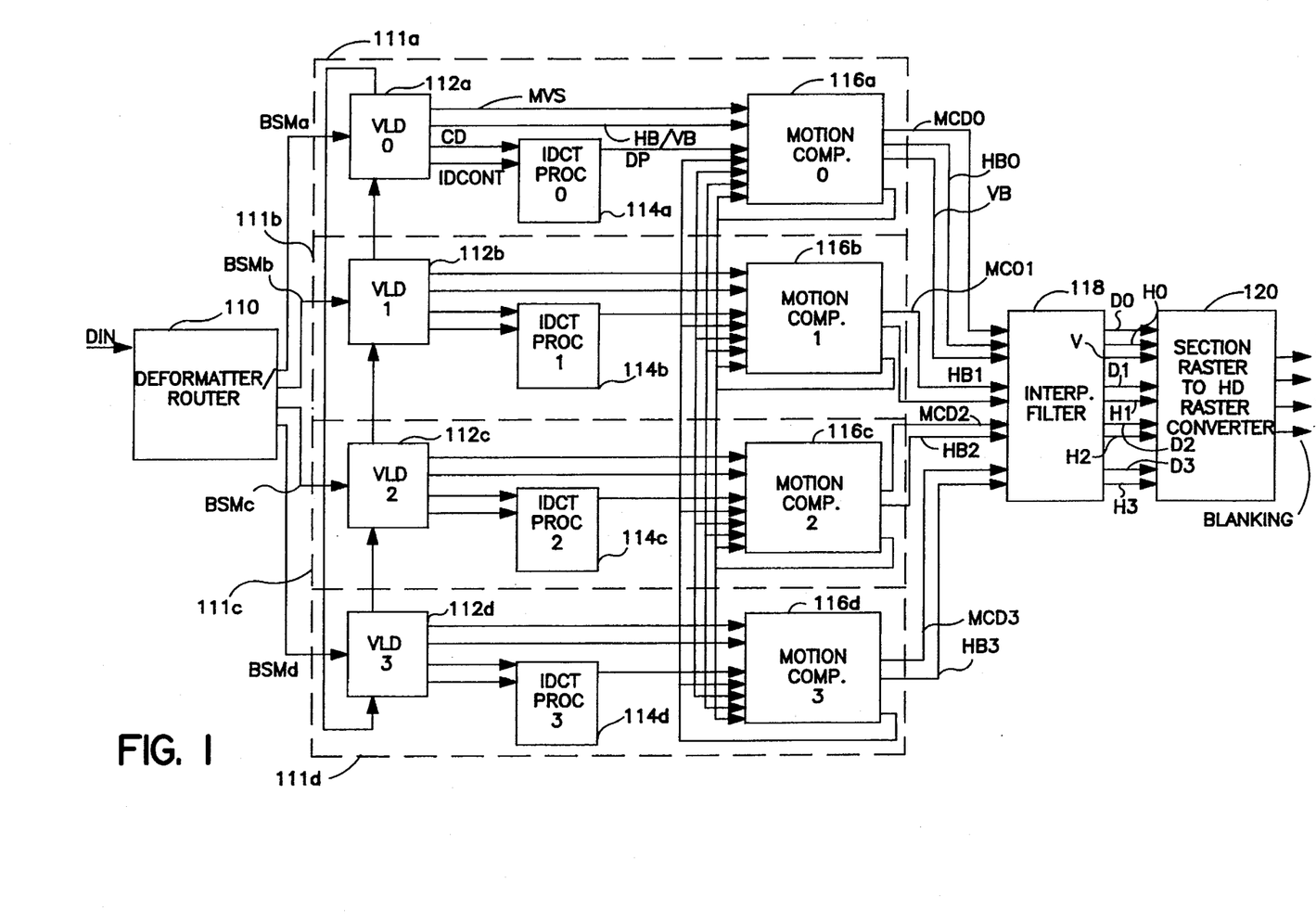
FIG. 1 is a block diagram of a high definition television decoder Which includes an embodiment of the present invention.

FIG. 1 is a block diagram of an exemplary HDTV decoding system, which may be used to decode high definition television signals that have been encoded according to the MPEG-2 standard. The diagram shown in FIG. 1 does not address some aspects of the high definition television decoding standard, for example, the demodulation of the received radio frequency HDTV signals to recover the digital data stream.

The decoder shown in FIG. 1, is arranged as four parallel decoders which are coupled to receive separate input data streams from a deformatter/router 110. These data streams are combined in an interpolation filter 118 and a raster converter 120 to produce video signals that are used to drive a high definition monitor (not shown).

In the exemplary embodiment of the invention as shown in FIG. 1, the deformatter/router 110 receives a digital HDTV signal (DIN) as consecutive 8-bit bytes at its input port. The deformatter/router 110 performs two functions, it converts the 8-bit parallel bit stream into a bit serial data stream and it recognizes control information in the data stream down to the slice layer. The recognized control information is passed to all four of the decoders 111a, 111b, 111c and 111d. The slice start code and the data which follows it are passed to one of the four processors based on the horizontal starting position of the slice in the final image.

As described above, the MPEG-2 standard defines six layers of information for a sequence of images. These are the sequence layer, the group of pictures layer, the picture layer, the slice layer, the macroblock layer and the block layer.

These various layers are defined in the above-referenced document-which describes the MPEG-2 standard. Briefly, the sequence layer includes the other five layers. The layers may be referred to as layers of data records. Thus, a sequence record includes at least one group of pictures record which, in turn, includes at least one picture record and so on, down to the block layer. The sequence layer defines the starting point of a set of images which can be decoded based only on the information following the start of the sequence. The next lower layer is the group of pictures layer. This layer defines a subset of the images contained in the sequence. The images in the group of pictures layer generally include at least one intra-encoded image and several predictively or bidirectionally encoded images.

Immediately below the group of pictures layer is the picture layer. The data records at this layer define single frame images. Below the picture layer is the slice layer. Each record at this layer represents a single slice of the image represented by the picture layer record. Below the slice layer are the macroblock and block layers. These layers represent successively more basic components of the image, as described above.

Each of these level records begins with a start code. All sequence start codes begin with at least 23 zeros and a one. The eight-bit value following the one determines the type of start code. Table 1 lists start codes which are relevant to the subject invention.

TABLE 1

| Start Code | Hexadecimal Value |
| --- | --- |
| PICTURE | 00000100 |
| SLICE (including vertical position) | 00000101 through 000001AF |
| SEQUENCE | 000001B3 |
| GROUP OF PICTURES | 000001B8 |

Following the sequence start code, are a plurality of parameters for the sequence of pictures. These include the horizontal and vertical size of the image in pixels, the pixel aspect ratio, the picture rate and the bit rate at which data is provided by the encoder.

Another two items which may be included in the sequence header are quantization matrices to be used in decoding intra-frame encoded data and non-intra-frame encoded data. If these matrices are not provided, default matrices, defined in the MPEG-2 standard, are used.

After the header information in the sequence record are one or more group of pictures level records. Each group of pictures record includes a header, containing a time code and two flags which are used in decoding the following group of pictures. The pictures in the group are represented by several picture records included in the group of pictures record. Following the final group of pictures in the sequence record is a sequence end code. This code, which has the same general format as a start code, is defined as the hexadecimal value 000001B7.

Unless the format of the data transmission is well known, decoding may only begin after a sequence start code and its accompanying header parameters have been encountered in the data stream. To prevent long delays between sequence start codes, ill is contemplated in the MPEG-2 standard that these start codes and their associated header information may be inserted multiple times in a given sequence. These header blocks may be inserted, for example, between alternate group of pictures records.

The header for the picture layer includes a temporal reference, which defines the order in which the pictures are displayed; a picture coding type which indicates that the picture is either intra-encoded (I-frame) forward predictively encoded (P-frame) or bidirectionally predictively encoded (B-frame). The picture header also contains a value which indicates how much of the bit stream should be buffered before the decoding operation can begin, and, optionally, a pair of values which define how motion compensation processing is to occur on a whole-frame basis (e.g. to describe an underlying motion that affects the entire frame, such as an image pan).

Figure 4:
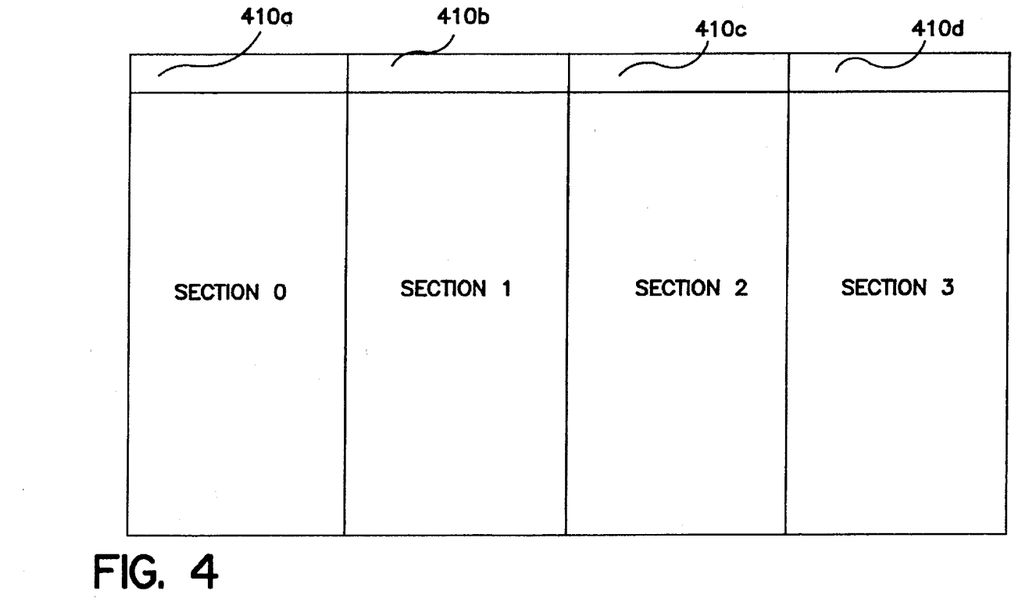
FIG. 4 is an image map diagram which is useful for describing the operation of the decoder shown in FIG. 1.

Following the header information for the picture record are one or more slice records. Each slice record includes one or more macroblock records. In ATUL's implementation, each slice defines a row of macroblocks which, when decoded, extend one-quarter of the way across the image. FIG. 4 is a image map diagram of an HDTV image which shows slices 410a, 410b, 410c and 410d spanning the image horizontally. In the exemplary, embodiment of the invention, each image includes 64 rows of slices, each row including four slices.

FIG. 1 is a block diagram of an HDTV decoder which includes an embodiment of the present invention. The decoder shown in FIG. 1 is arranged in four parallel decoding channels. In, general terms, a deformatter/router 110 divides the demodulated bit stream into four parts, sending one part to each of the four channels, 111a, 111b, 111c and 111d. As described below, each of these channels handles image data formatted in slices, representing respectively different sections of the resulting image, and produces decoded data in raster format. The decoded data provided by the four channels is horizontally interpolated in sections by the interpolation filter 118. The sections are then combined in the section raster to high-definition raster converter 120.

Figure 2:
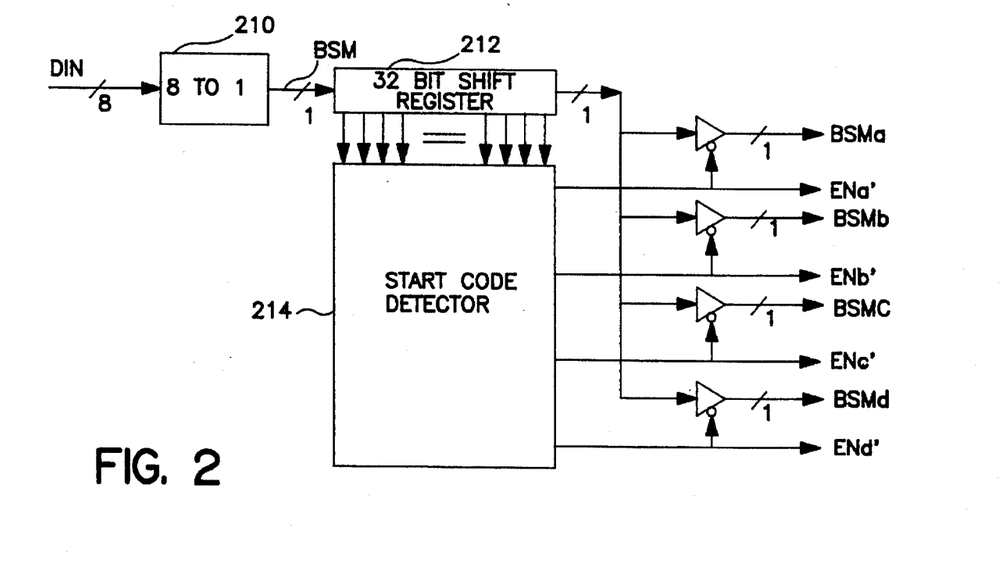
FIG. 2 is a block diagram of a deformatter/router suitable for use with the high definition television decoder shown in FIG. 1.

FIG. 2 is a block diagram of circuitry suitable for use as the deformatter/router 110. As shown in FIG. 2, the deformatter/router includes an 8-bit parallel to serial converter 210 which converts the 8-bit parallel input signal into a bit-serial output signal, BSM. The signal BSM, in turn, is applied to a 32-bit shift register 212. The shift register 212 has a 32-bit parallel output port connected to a start code detector 214. The bit-serial signal provided by the shift register 212 is applied in parallel to four gating circuits, 216a, 216b, 216c and 216d. The gating circuits are controlled by four respective active-low control signals, ENa', ENb', ENc' and ENd'. These control signals are generated by the start code detector 214.

In the exemplary embodiment of the invention, the start code detector 214 is a finite state machine which includes a memory (not shown) that receives the 32-bit signal provided by the shift register 212. As described above, the start codes appear in the bit-stream as 32-bit values: 23 zeros followed by a 1 and an eight-bit value which indicates the type of start code. The memory in the start code detector is programmed to recognize start codes for the sequence, group of pictures, picture and slice layers and the sequence stop code.

When the detector 214 detects a sequence stop code or a start code that indicates a sequence, group-of-pictures or picture layer, it brings all of the enable signals, ENa', ENb', ENc' and ENd' to a logic-low state causing the gates 216a, 216b, 216c and 216d to transmit the detected stop or start code and all of the information between the detected code and the next detected code to all four of the decoders 111a, 111b, 111c, and 111d.

When the start code detector 214 encounters the first slice code in any vertical position, it sends the slice code and all information following that code (i.e. the slice record) only to decoder 111a. When the next slice code is encountered that slice record is sent to decoder 111b. The next following slice record is sent to decoder 111c, and the last slice record at that vertical position is sent to decoder 111d. As shown above in Table 1, the vertical position of a slice is encoded in the low-order eight-bits of the slice start code. This position value is 1 at the top of the image and, under the MPEG-2 standard, may be as large as 175 (AF hexadecimal) at the bottom of the image.

After processing four consecutive slice records, the next slice record encountered by the deformatter/router is sent to decoder 111a. The demultiplexing of the slice records continues in this manner until a start code other than a slice start code (including a sequence end code) is detected. This detected start code and the header information which follows it are broadcast to all four decoders as are all other such start codes and headers until a slice start code is encountered. This next slice start code marks the first slice record of a new picture which is sent to decoder 111a beginning the demultiplexing operation again.

Figure 3:
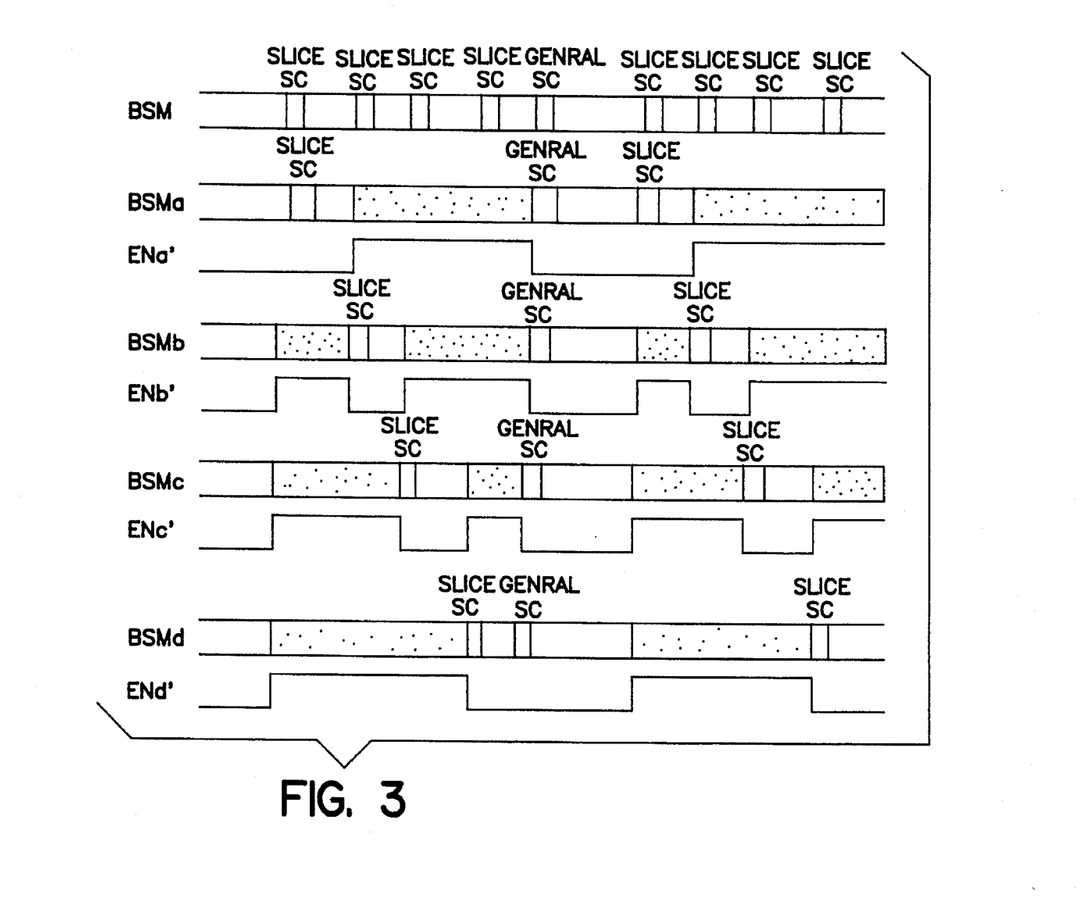
FIG. 3 is a timing diagram which is useful for describing the operation of the deformatter/router shown in FIG. 2.

FIG. 3 is a timing diagram which shows the operation of the deformatter/router. As shown in this Figure, the slice records for four consecutive slices are sent to respectively different ones of the decoders 111a, 111b, 111c and 111d via the demultiplexed bit-stream signals BSMa, BSMb, BSMc and BSMd. The general record data (i.e. the header information from sequence records, group of pictures records and picture records) is sent to all four of the decoders via all four of the bit stream signals BSMa, BSMb, BSMc and BSMd.

As shown in FIG. 4, using the exemplary encoding standard, four consecutive slices span the width of the HDTV image. Due to the demultiplexing performed by the deformatter/router 110, all slices in column 410a of the image 410 are processed by decoder 111a, all slices in column 410b are processed by decoder 111b all slices in column 410c are processed by decoder 111c and all slices in column 410d are processed by decoder 111d.

Referring to FIG. 1, the demultiplexed bit stream provided by the deformatter/router 110 is applied to the variable length decoders 112a, 112b, 112c and 112d. Each of these decoders provides four output signals, a coefficient data signal, CD, and a control signal, IDCONT, that convey coefficient data and side information, respectively to one of the inverse discrete cosine transform (IDCT) processors 114a, 114b, 114c and 114d, a motion vector and side information data stream, MVS, and a horizontal blanking/vertical blanking signal, HB/VB, which is applied to a respective motion compensation processor 116a, 116b, 116c and 116d.

Each variable length decoder 112 extracts header information from the general records that it receives and extracts and decodes run-length and code values for the variable length encoded DCT coefficient macroblocks that are applied to its input port. These run-length and code values are applied to a coefficient processor (not shown) internal to the variable length decoder 112, where they are converted into macroblocks of quantized coefficient values.

Figure 5:
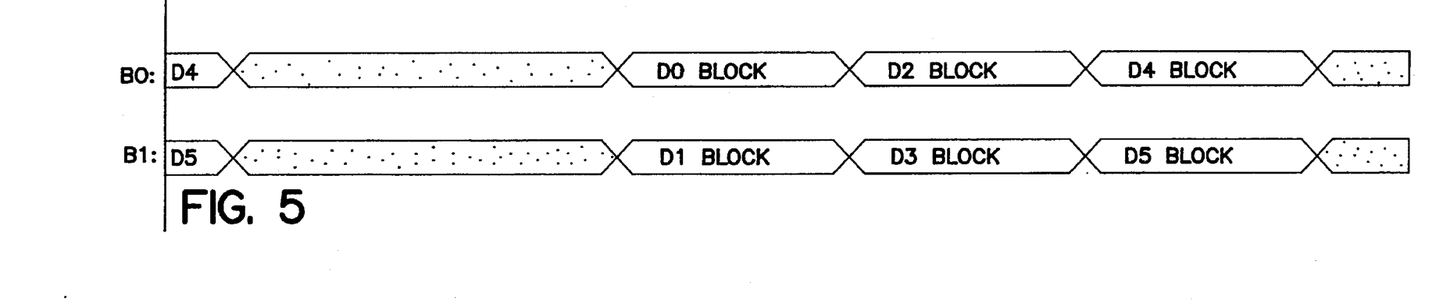
FIG. 5 is a timing diagram which is useful for describing the operation of the decoder shown in FIG. 1.

The coefficients in each macroblock are dequantized in the IDCT processors 114a, 114b, 114c and 114d and the dequantized coefficients are then subject to an inverse discrete cosine transformation. The output signal, DP, provided by each of the IDCT processors is actually a pair of bit-streams, each bit-stream representing blocks of decoded pixel values that constitute the macroblocks. FIG. 5 is a timing diagram which illustrates the format of the signals provided by each of the IDCT processors.

As described above, each macroblock of pixel values includes four blocks of luminance information Y, and one block each of two color difference signals, U and V. In the exemplary embodiment of the invention, the luminance blocks are numbered 0, 1, 2 and 3 and the chrominance blocks are numbered 4 and 5. The IDCT processors 114a, 114b, 114c and 114d provide the blocks of pixel values via two busses, B0 and B1. FIG. 5 illustrates the order in which the blocks that make-up a macroblock are provided via these two busses.

Under the MPEG-2 standard, the macroblocks of pixel values may be either absolute pixel values or differential pixel values. When the macroblocks contain differential values, the corresponding macroblock also includes motion vector information. This motion vector information is decoded by the respective variable length decoders 112a, 112b, 112c and 112d and is provided, via the signals MVS, to the respective motion compensation processors 116a, 116b, 116c and 116d. The motion compensation processors, described in detail below with reference to FIGS. 6 and 7, use the absolute or differential pixel information and, optionally, the motion vector information to recover absolute pixel values for the image slices. These pixel values are provided by the motion compensation processor 116a to the interpolation filter 118.

Depending on the horizontal size of the input image, the interpolation filter 118 expands the image to fit the aspect ratio of the receiver's display device. In the exemplary embodiment of the invention, the luminance component, Y, of the image is only expanded horizontally by the interpolation filter 118. The chrominance components are expanded both horizontally and vertically by a factor of two to produce a number of chrominance samples of each of the U and V color difference signals which matches the number of samples of the interpolated luminance signal. It is contemplated, however, that the interpolation filter 118 may be adapted to perform both horizontal and vertical interpolation on all of the image components, Y, U and V.

The output signals of the interpolation filter 118 are applied to section-raster to high-definition-raster converter 120. Converter 120 combines the various interpolated section signals to produce samples representing the luminance signal, Y and two color difference signals, U and V in proper raster format for display on the receiver's display device. In addition, the converter 120 generates a composite blanking signal for the receiver's display device.

To understand the operation of the motion compensation processors 116a, 116b, 116c and 116d, it is helpful to understand the order in which individual picture records occur in a group of pictures record and the order in which the pictures are displayed. In the MPEG-2 standard, each group of pictures record generally includes one I-frame, several P-frames and several B-frames. The I-frame is provided to refresh the picture to compensate for errors which would otherwise propagate through a sequence of pictures. P-frames are frames that are predicted from an earlier I-frame or P-frame in the display sequence. B-frames are bidirectionally predicted from at least one of an earlier I- or P-frame and a later I- or P-frame in the display sequence.

Figure 7:
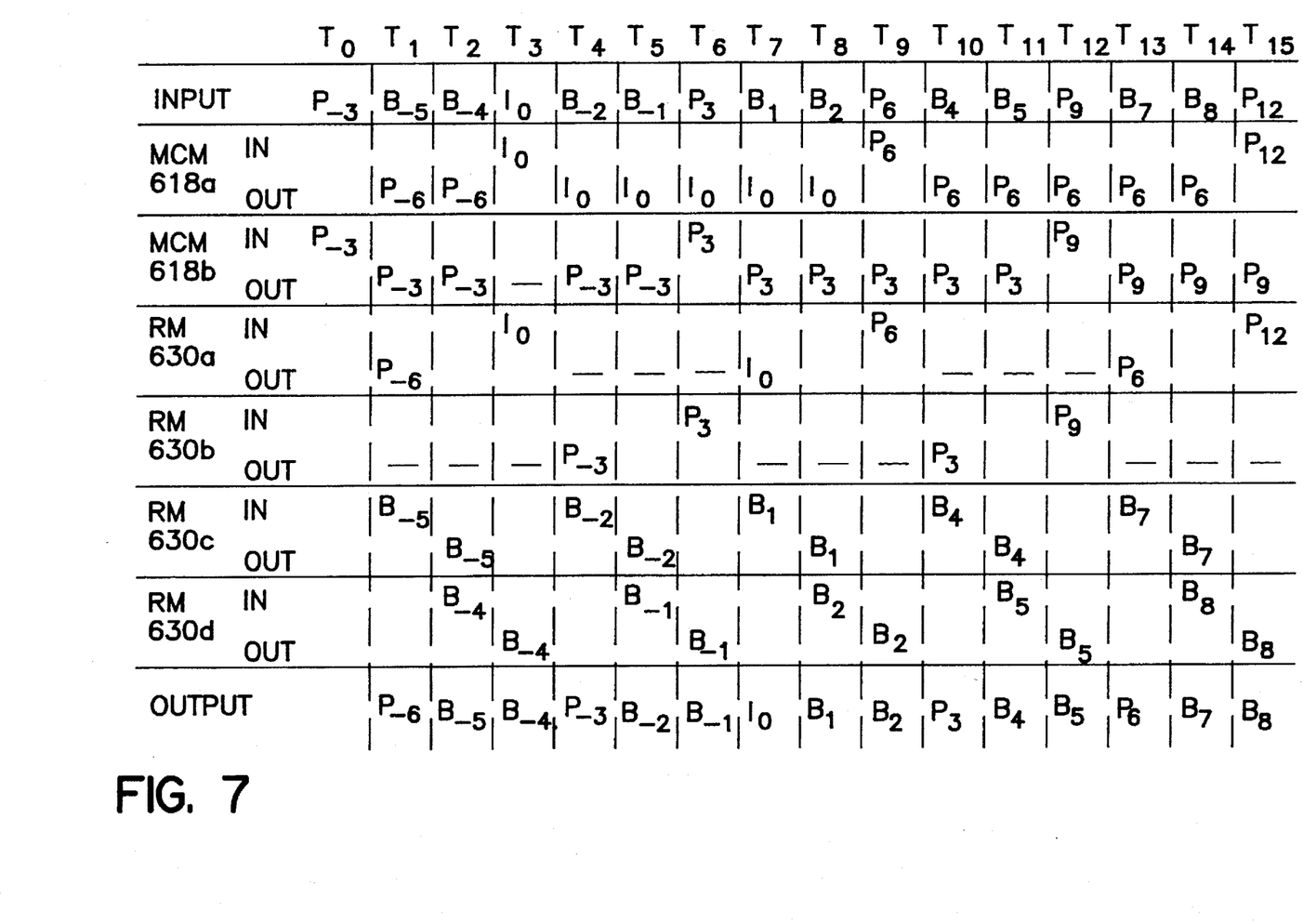
FIG. 7 is a frame timing diagram which is useful for describing the operation of the motion compensation processing circuitry shown in FIG. 6.

Because the B-frames are predicted from frames which occur later in the display sequence, the order of encoded frames in an MPEG-2 bit stream is not the same as the display order. One exemplary order is shown in FIG. 7. As shown in this Figure, starting at time $T_3$, the frames are received in the order $I_0, B_{-2}, B_{-1}, P_3, B_1, B_2, P_6, B_4, B_5, P_9, B_7, B_8$. When these frames are processed by the motion compensation processors 116, they are displayed in the order $B_{-2}, B_{-1}, I_0, B_1, B_2, P_3, B_4, B_5, P_6, B_7, B_8, P_9$.

To accommodate both the forward and bidirectional prediction modes, each of the motion compensation processors 116a, 116b, 116c and 116d includes two frame memories, one for holding a picture to be used in forward predictions and the other for holding a picture to be used in backward predictions. In addition, the motion compensation processors of the exemplary embodiment of the invention convert the block-format video information, in the input frame order, into raster format information for an interlace scan raster in the display frame order. As described below, each motion compensation processor 116 includes four half-frame memories for this purpose.

Figure 6:
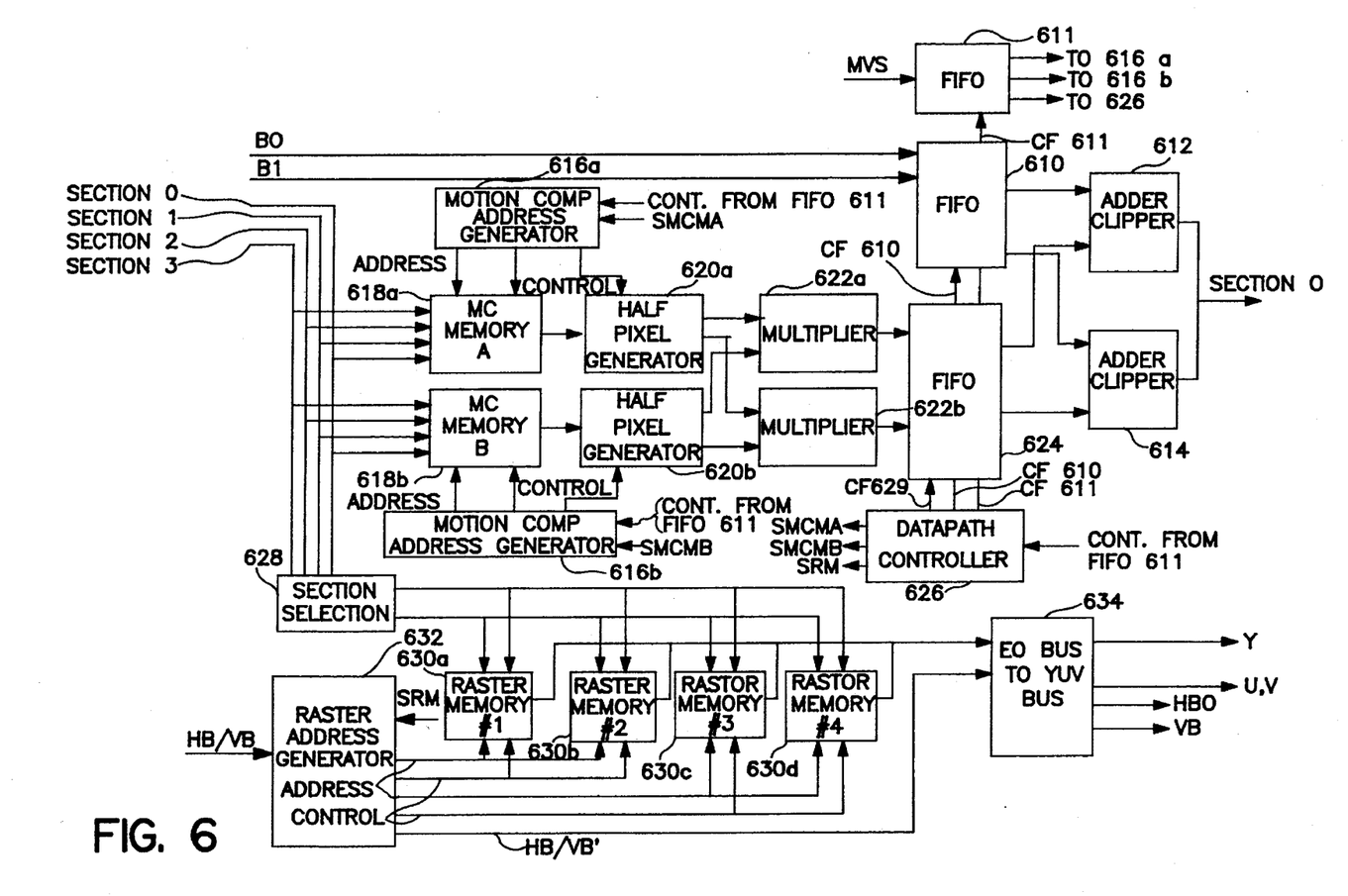
FIG. 6 is a block diagram of circuitry suitable for use in the motion compensation processor shown in FIG. 1.

Thus, even though each of the processors 116a through 116d processes only one segment of the image, as described above with reference to FIG. 4, it stores, in the motion compensation memories 618a and 618b, two entire frames of video information. This architecture is desirable so that a given motion compensated macroblock of data in the segment that is being processed may obtain a motion reference macroblock from anywhere in the image.

FIG. 6 is a block diagram of circuitry suitable for use as the motion compensation processor 116a. The circuitry for the processors 116b, 116c and 116d may be identical. In FIG. 6, the bus signals B0 and B1 provided by the IDCT processor 114a are applied to respective input ports of a first-in-first-out (FIFO) memory 610. The FIFO memory 610 converts the stream of blocks of pixel data received from the IDCT processor 114a, as shown in FIG. 5, into macroblocks. The FIFO memory 610 provides one-half of the macroblock, representing the odd-numbered pixels of the macroblock, to one input port of an adder/clipper 612 and provides the other one-half of the macroblock, representing the even-numbered pixels of the macroblock to one input port of an adder/clipper 614. The other input ports of the adder/clippers 612 and 614 are Coupled to receive corresponding odd-numbered and even-numbered pixels of a stored macroblock from a FIFO memory 624. The output ports of the adder/clippers 612 and 614 are combined such that a full macroblock of data is conveyed as the signal SECTION 0.

In the exemplary embodiment of the invention, pixels from a prior stored frame (i.e. either an I-frame or a P-frame) are stored in one of the motion compensation memories 618a or 618b while pixels from a subsequent stored frame are stored in the other motion compensation memory 618b or 618a. The pixels stored into the memories 618a and 618b are received via four busses labeled SECTION 0 through SECTION 3. As shown in FIG. 1, the pixel values conveyed by each of these busses are generated by a respectively different one of the four motion compensation processors 116a, 116b, 116c and 116d. In the exemplary embodiment of the invention, the SECTION 0 pixel values are produced by processor 116a while the SECTION 1 values are produced by processor 116b and the SECTION 2 and SECTION 3 values are produced by processors 116c and 116d, respectively. As described above, the SECTION 0 signal is provided as the combined output signal of the adder/clipper circuits 612 and 614.

For data from I-frames, the output signal SECTION 0 is generated by passing the blocks provided via the busses B0 and B1 through the FIFO memory 610 and the adder/clippers 612 and 614 without modification. For P- and B-frames, the SECTION 0 signal is generated from the signals provided via the busses B0 and B1 and by motion compensated processing using data provided by the memories 618a and 618b.

The data which is provided by the memories 618a and 618b is determined by the motion vector and side information signal, MVS, provided by the variable length code processor 112a. The signal MVS is provided to the motion compensated address generators 616a and 616b via the FIFO memory 611. In the exemplary embodiment of the invention, either memory 618a or 618b may be used to hold the future frame or the past frame for motion compensation processing. Depending on which frames are stored in which memories, either of the address generators 616a or 616b may receive the forward motion vector data or backward motion vector data. Which frame memory 618a or 618b is used to hold which reference frame is determined by the datapath controller 626. Once an initial assignment has been determined, image frames stored in these memories are replaced by I-frame or P-frame data using a ping-pong method such that the oldest data is replaced by the newly received data. In addition, the datapath controller 626 determines when data is to be read from the FIFO's 610, 611 and 624 via the control signals CF610, CF611 and CF624, respectively. The controller 626 also receives the motion vector and side information signal MVS from the FIFO memory 611. Based on these motion vectors, one or both of the motion compensation memories 618a and 618b provide data values to the respective half pixel generators 620a and 620b.

In the MPEG-2 standard, it is permissible to classify motion, for the purpose of motion compensated processing, in one-half pixel intervals. Since only full pixel values are stored in the memories 618a and 618b, it is desirable to include some form of interpolation in an MPEG-2 decoder so that the full standard may be accommodated. In the exemplary embodiments of the invention, the half pixel generators 620a and 620b perform this interpolation function, responsive to control signals provided by the respective address generators 616a and 616b.

When a B-frame is processed by the exemplary embodiment of the invention, the memories 618a and 618b and the half-pixel generators 620a and 620b each provide blocks of pixel values representing a macroblock at a displacement from the macroblock provided by the busses B0 and B1 as indicated by the motion vectors applied to the motion compensation address generators 616a and 616b.

Even numbered pixels of each of the forward and backward macroblocks are applied to the multiplier 622a while odd numbered pixels of each macroblock are applied to the multiplier 622b. When a B-frame is being processed, each of the multipliers 622a and 622b combines respective pixel values from each of the received macroblocks in a set proportion and provides the combined pixel values to the FIFO memory 624. In the exemplary embodiment of the invention, the pixel values are combined in a 1:1 proportion. It is contemplated, however, that different proportions may be used and that the multipliers 622a and 622b may be programmed based on these provided proportion values, for example, by the motion compensation address generators 616a and 616b, responsive to side information conveyed as a part of the signal MVS.

As described above, the FIFO memories 610 and 624 provide the odd-numbered pixels from the respective macroblocks to the adder/clipper 612 and provide the even-numbered pixels to the adder/clipper 614. These circuits sum the respective pixel values to generate the motion compensated pixel values. Each of the adder/clippers 614 also limits or clips the magnitude of the summed values to be less than or equal to 255. The odd-numbered and even-numbered pixels representing the motion compensated output pixel data are conveyed by separate busses (not shown) from the adder/clippers 612 and 614 to the memories 618a and 618b and the section selection circuitry 628. For Convenience, these busses are shown in FIG. 6 as being respective single busses.

Each of the address generators 616a and 616b also receives a signal SMCMa and SMCMb, respectively, from a datapath controller 626. This signal indicates whether data provided via the SECTION 0 to SECTION 3 signals is to be written into the respective motion compensation memory 618a or 618b. As described above, these memories hold reference backward and forward prediction frames. Under the MPEG-2 standard, only an I-frame or a P-frame may be used as a reference prediction frame. Consequently, not every frame provided via the signals SECTION 0 through SECTION 3 is stored into one of the memories 618a and 618b. The signals SMCMa and SMCMb are selection signals which cause the reference frames to be stored into the memory 618a or 618b, respectively. The signals SMCMa and SMCMb are generated by a datapath controller 626, responsive to a frame type signal conveyed in the signal MVS provided by the variable length decoder 112a, shown in FIG. 1, via the FIFO memory 611. If the received data is from an I-frame or a P-frame, the controller 626 activates the appropriate signal SMCMa or SMCMb to store the data into the memory 618a or 618b. The memory containing the oldest data is selected by the controller 626 to receive the new data. The datapath controller 626 also receives a macroblock synchronization signal, as a part of the signal MVS, which allows it to align the side information with the coefficient data.

The odd-numbered and even-numbered pixels of each macroblock are provided via the signals SECTION 0, SECTION 1, SECTION 2 and SECTION 3 to the section selection circuitry 628. The pixel values conveyed by each of these signals correspond to the section 0, section 1, section 2 and section 3 divisions of the image frame shown in FIG. 4. The section selection circuitry selects section data for storage into the raster memories 630a through 630d.

In a raster scan image, data from one frame is displayed line-by-line from the top of the image to the bottom of the image, Because the data provided via the signals SECTION 0 through SECTION 3 are in macroblock order, the signals received via these lines are stored and reformatted using the section selection circuitry 628, the memories 630a, 630b, 630c, and 630d, and the raster address generator 632.

Each of the memories 630a, 630b, 630c, and 630d holds one-half of one frame of video information, representing successive ones of the sections shown in FIG. 4. For example, since the circuitry shown in FIG. 6 is circuitry for the motion compensation processor 116a shown in FIG. 1, each of the raster memories holds only that data which represents section 0 and section 1. The raster memories for processor 116b hold data for section 1 and 2, the memories for processor 116c hold data for section 2 and section 3. The memories for processor 116d hold only that data which represents section 3. No additional section data is stored for this processor since none could be used by the interpolation filter to ensure that the right-hand edge of section 3 is properly interpolated. In the exemplary embodiment of the invention, the left-hand edge of section 0 and the right-hand edge of section 3 may not be properly interpolated. Because the pixel values for this data are displayed at the edges of the image, it is contemplated that they will be hidden in the overscan region of the display device.

The memories 630a, 630b, 630c and 630d store image frames as they are provided via the signals SECTION 0 and SECTION 1 and then provide the data in raster-scan order and in display frame order. The addresses and control signals for the memories 630a, 630b, 630c, and 630d are generated by the raster address generator 632. In generating these addresses, the generator 632 is responsive to a raster memory selection signal SRM provided by the datapath controller 626.

The bus converter 634 demultiplexes the data stream, which is provided in the sample order Y,U,Y,V,Y,U,Y,V, . .

, where Y represents a luminance sample and U and V represent samples of respective color difference signals. The output signals provided by the converter 634 are a luminance signal, Y, and a chrominance signal consisting of alternating U and V samples.

As shown in FIG. 1, the motion compensation processor 116a receives information on horizontal and vertical blanking intervals from the VLD processor 112a and provides a horizontal blanking signal, HB0 and vertical blanking signal VB. In the exemplary embodiment of the invention, this is accomplished via a signal HB/VB' applied to the bus converter 634 by the raster address generator 632. This signal is generated by raster address generator 632 based on the HB/VB signal received from VLD processor 112a. The exemplary generator 632 changes the timing of the horizontal and vertical blanking signals (HB/VB) to produce the signal HB/VB' which matches the data being read from the raster memories 630a through 630d. This changed signal is applied to the converter 634 which again changes timing of the horizontal and vertical blanking signals to produce the signals HB0 and VB, which match the signals Y and U,V provided by the bus converter 634.

FIG. 7 is a timing diagram which illustrates how data values are written into and read from the various memories. The vertical divisions in FIG. 7 represent various time intervals, $T_0$ through $T_{15}$. The first row, labeled Input, represents the order in which portions of the image frames are received at the motion compensation processor 116a via the busses B0 and B1. Each of the six following rows describe when data is written into and read from the two motion compensation memories 618a and 618b and four raster memories 630a, 630b, 630c and 630d. The bottom row, labeled Output, describes the order in which frames are provided by the motion compensation processor 116a.

Starting from time $T_3$, a first I-frame, $I_0$, is provided to the motion compensation processors 116 and is stored into one of the motion compensation memories, for example memory 618a and, at the same time, into, for example, the raster memory 630a. Since this is an intraframe coded image, no motion compensation processing is performed during the time interval $T_3$. At time $T_4$, segment data representing the frame $B_{-2}$ are provided to the processor 116a and bidirectional motion compensation processing is performed on this frame using data from the frame $P_3$, which was stored in motion compensation memory 618b at time $T_0$ and data from the frame $I_0$, stored in memory 618a. The result is stored into the raster memory 630c during time interval $T_4$. Also during the time interval $T_4$, segment data from the decoded frame $P_{-3}$ is provided from the raster memory 630b.

At time $T_5$, data representing frame $B_{-1}$ is received by the motion compensation processor 618a. This data is also subject to bidirectional motion compensation processing using the decoded frame $I_0$ stored in memory 618a and the processed frame $P_{-3}$ stored in the memory 618b. The processed frame $B_{-1}$ is stored into the memory 630d during time interval $T_5$ while data from the processed frame $B_{-2}$ is read from the memory 630c.

During time interval $T_6$, data from a predictive frame, $P_3$ is applied to the motion compensation processor 618a. This data is processed using the data from the frame $I_0$, which was stored into the motion compensation memory 618a during time interval $T_3$. The resulting processed data for frame $P_3$ is stored into the raster memory 630b during time interval $T_6$. Also in time interval $T_6$, the stored frame $B_{-1}$ is provided from the memory 630d. At time $T_7$, the bidirectional frame $B_1$ is received by the processor 116a, it is processed using data in the stored frames $I_0$ and $P_3$ and is stored into the raster memory 630c. During the interval $T_7$, segment data from the stored frame $I_0$ is provided from the raster memory 630a.

Processing continues in this manner with the frames $B_2$, $P_6$, $B_4$, $B_5$, $P_9$, $B_7$ and $B_8$ being received during the respective time intervals $T_8$, $T_9$, $T_{10}$, $T_{11}$, $T_{12}$, $T_{13}$ and $T_{14}$. During these time intervals, segment data from the processed image frames $B_1$, $B_2$, $P_3$, $B_4$, $B_5$, $B_6$ and $B_7$ are provided from the raster memories 630a through 630d as shown in FIG. 7.

It is noted that a processed image frame stored in one of the motion compensation memories 618a and 618b may be used, at different times, as both a forward and backward reference memory for bidirectional prediction. For example, during the time intervals $T_4$ and $T_5$, the stored frame $I_0$ is used as a backward reference memory to predict values for the frames $B_{-2}$ and $B_{-1}$ while during time intervals $T_6$, $T_7$ and $T_8$ it is used as a forward reference memory to predict pixel values for frames $P_3$, $B_1$ and $B_2$.

The invention has been described in terms of a system which uses four parallel channels, it is contemplated that it may be practiced by similar circuitry which divides the input bit-stream into differing numbers of channels or channels which process different areas of the image. For example, it may be desirable to split the image vertically as well as horizontally such that, for example, the image is processed in four segments, each representing a respective quadrant of the image.

While the invention has been described in terms of an exemplary embodiment it is contemplated that it may be practiced as outlined above within the spirit and scope of the appended claims.

Invention claimed is:

1. A system suitable for decoding video signals, representing an image, that have been encoded according to the MPEG-2 standard, comprising:

deformatting means for receiving the encoded video signals and for separating the received signals into N parallel bit streams, where N is an integer;

N processing means, each coupled to the deformatting means to receive a respectively different one bit stream of the N parallel bit streams, each of the N processing means including:

memory means for storing an entire frame of the previously decoded image;

variable length decoding means for decoding encoded image data and motion vector data from the one bit stream; and motion compensation processing means, coupled to the variable length decoding means and the memory means for combining the decoded image data with data from a previously decoded image frame according to the motion vector data to produce motion compensated decoded image signals.

2. A system according to claim 1, wherein the motion compensation processing means further includes:

means for sending the motion compensated decoded image signals to the motion compensation processing means of each of the N processing means;

input means for receiving motion compensated decoded image signals from each of the N processing means; and means for storing the received motion compensated decoded image signals into the memory.

3. A system suitable for decoding video signals, representing an image, that have been encoded according to the MPEG-2 standard, wherein the encoded video signal includes general data and data representing consecutive image slices, comprising:

deformatting means for receiving the encoded video signals and for separating the received signals into N parallel bit stream, where N is an integer, including means for including the general data in all N of the parallel bit streams and for including data representing each consecutive slice in a respectively different one of the N bit-streams;

N processing means, each coupled to the deformatting means to receive a respectively different one bit stream of the N parallel bit streams, each of the N processing means including:

variable length decoding means for decoding encoded image data and motion vector data from the one bit stream; and motion compensation processing means, coupled to the variable length decoding means for combining the decoded image data with data from a previously decoded image frame according to the motion vector data to produce motion compensated decoded image signals, wherein the motion compensation processing means includes:

a memory which holds an entire frame of the previously decoded image;

means for sending the motion compensated decoded image signals to the motion compensation processing means of each of the N processing means;

input means for receiving motion compensated decoded image signals from each of the N processing means; and means for storing the received motion compensated decoded image signals into the memory.

4. A system according to claim 3, wherein the motion compensation processing means further includes a further frame memory for holding data from a further previously decoded image frame, wherein the means for storing the motion compensated decoded image signals into the memory further includes means for storing motion compensated decoded image signals representing the further previously decoded image frame into the further memory.

5. A system suitable for decoding video signals, representing an image, that have been encoded according to the MPEG-2 standard, comprising:

deformatting means for receiving the encoded video signals and for separating the received signals into N parallel bit streams, where N is an integer;

N processing means, each coupled to the deformatting means to receive a respectively different one bit stream of the N parallel bit streams, each of the N processing means including:

variable length decoding means for decoding encoded image data and motion vector data from the one bit stream;

raster memory means for holding motion compensated image data representing a predetermined portion of the image;

means coupled to the input means for storing the received motion compensated decoded image signals from M of the N processing means, as the predetermined portion of the image, into the raster memory means, where M is an integer less than N;

means coupled to the raster memory means for providing the stored image signals in raster scan order; and motion compensation processing means, coupled to the variable length decoding means for combining the decoded image data with data from a previously decoded image frame according to the motion vector data to produce motion compensated decoded image signals, wherein the motion compensation processing means includes:

a memory which holds an entire frame of the previously decoded image;

means for sending the motion compensated decoded image signals to the motion compensation processing means of each of the N processing means;

input means for receiving motion compensated decoded image signals from each of the N processing means; and means for storing the received motion compensated decoded image signals into the memory.

6. Apparatus for decoding an encoded video signal representing a video image, which video signal has been encoded in segments corresponding to distinct regions of the image, the apparatus comprising:

a deformatter which separates the encoded video signal into a plurality of signal portions, each representing a respectively different segment; and a plurality of decoders each coupled to receive a respectively different one of the plurality of signal portions provided by the deformatter, wherein each of the plurality of decoders includes:

motion compensated processing means for decoding signal portions which have been encoded using motion compensated encoding techniques to produce decoded image data; and a memory which holds decoded data representing an entire previously received image and coupled to the motion compensated processing means to provide portions of the held data to the motion compensated processing means for use in decoding the encoded signal portions.

7. Apparatus according to claim 6, wherein each decoder further includes means for providing its decoded image data to the respective memories of each of the plurality of decoders to be stored as the held data.

8. Apparatus for decoding an encoded video signal representing a video image, which video signal has been encoded in segments corresponding to distinct regions of the image, the apparatus comprising:

a deformatter which separates the encoded video signal into a plurality of signal portions, each representing a respectively different segment; and a plurality of decoders each coupled to receive a respectively different one of the plurality of signal portions provided by the deformatter, wherein each of the plurality of decoders includes:

motion compensated processing means for decoding signal portions which have been encoded using motion compensated encoding techniques to produce decoded image data including;

a further memory which holds further decoded data representing a further entire previously received image; and means, responsive to the motion vector data for directing the decoded sections provided by the motion compensated processing means to one of the memory and the further memory;

a memory which holds decoded data representing an entire previously received image and coupled to the motion compensated processing means to provide portions of the held data to the motion compensated processing means for use in decoding the encoded signal portions;

means for providing the decoded image data to the respective memories of each of the plurality of decoders to be stored as the held data;

means for extracting motion vector data from the encoded video data; and means for providing the motion vector data to the motion compensated processing means.

9. A system according to claim 8, wherein each of the plurality of decoders further includes:

raster memory means for holding motion compensated image data representing a predetermined portion of the image;

means coupled to the input means for storing the received motion compensated decoded image signals from M of the N processing means, as the predetermined portion of the image, into the raster memory means, where M is an integer less than N; and means coupled to the raster memory means for providing the stored image signals in raster scan order.

* * * * *